United States Patent
Lavagno et al.

(10) Patent No.: US 12,468,581 B2
(45) Date of Patent: Nov. 11, 2025

(54) INTER-KERNEL DATAFLOW ANALYSIS AND DEADLOCK DETECTION

(71) Applicant: Xilinx, Inc., San Jose, CA (US)

(72) Inventors: Luciano Lavagno, Berkeley, CA (US); Xin Jin, Beijing (CN); Dan Liu, Beijing (CN); Thomas Bollaert, Portland, OR (US); Hem C. Neema, San Jose, CA (US); Chaosheng Shi, Beijing (CN)

(73) Assignee: Xilinx, Inc., San Jose, CA (US)

( * ) Notice: Subject to any disclaimer, the term of this patent is extended or adjusted under 35 U.S.C. 154(b) by 1098 days.

(21) Appl. No.: 17/385,261

(22) Filed: Jul. 26, 2021

(65) Prior Publication Data

US 2023/0032302 A1 Feb. 2, 2023

(51) Int. Cl.
  *G06F 9/52* (2006.01)
  *G06F 5/06* (2006.01)
  *G06F 30/20* (2020.01)

(52) U.S. Cl.
  CPC ............... *G06F 9/524* (2013.01); *G06F 5/06* (2013.01); *G06F 30/20* (2020.01)

(58) Field of Classification Search
  CPC . G06F 9/524; G06F 5/06; G06F 30/20; G06F 30/3308; G06F 30/25; G06F 30/27; G06F 30/28; G06F 2111/00–2111/92; G06F 30/33

See application file for complete search history.

(56) References Cited

U.S. PATENT DOCUMENTS

| | | |
|---|---|---|
| 5,648,913 A | 7/1997 | Bennett et al. |
| 5,659,484 A | 8/1997 | Bennett et al. |
| 5,971,595 A | 10/1999 | Grant et al. |
| 6,086,629 A | 7/2000 | McGettigan et al. |
| 6,152,612 A * | 11/2000 | Liao ............... G06F 30/33 703/23 |
| 6,308,309 B1 | 10/2001 | Gan et al. |
| 7,073,149 B2 | 7/2006 | Knol et al. |
| 7,185,309 B1 | 2/2007 | Kulkarni et al. |
| 7,251,804 B1 | 7/2007 | Trimberger |
| 7,281,093 B1 | 10/2007 | Kulkarni et al. |
| 7,367,007 B1 | 4/2008 | Sundararajan et al. |

(Continued)

OTHER PUBLICATIONS

Choi, Y. "Performance Debugging Frameworks for FPGA High-Level Synthesis" [Thesis] Computer Science, University of California, Los Angeles [retrieved on Aug. 7, 2024] (Year: 2019).*

(Continued)

*Primary Examiner* — Emerson C Puente
*Assistant Examiner* — Alfred H B Wechselberger
(74) *Attorney, Agent, or Firm* — Kevin T. Cuenot

(57) ABSTRACT

Inter-kernel dataflow analysis and deadlock detection includes, for each kernel of a plurality of kernels of a design, including, using computer hardware, a signal for the kernel that is asserted in response to all processes inside the kernel stalling, wherein the plurality of kernels form a strongly connected component. For each kernel of the plurality of kernels, the signal is asserted during operation of the design in response to each process in the kernel stalling. A notification is generated indicating that the strongly connected component is deadlocked in response to each kernel of the strongly connected component asserting the signal.

16 Claims, 10 Drawing Sheets

(56) References Cited

U.S. PATENT DOCUMENTS

| | | | |
|---|---|---|---|
| 7,500,060 | B1 | 3/2009 | Anderson et al. |
| 7,574,680 | B1 | 8/2009 | Kulkarni et al. |
| 7,650,248 | B1 | 1/2010 | Baxter |
| 7,970,977 | B1 | 6/2011 | Li |
| 8,006,021 | B1 | 8/2011 | Li et al. |
| 8,020,163 | B2 | 9/2011 | Nollet et al. |
| 8,104,011 | B1 | 1/2012 | Sundararajan et al. |
| 8,154,989 | B1 | 4/2012 | Susai |
| 10,133,549 | B1* | 11/2018 | Do .................... G06F 13/4243 |
| 10,445,456 | B1 | 10/2019 | Fraisse |
| 10,565,346 | B1 | 2/2020 | Suthar et al. |
| 10,628,547 | B1 | 4/2020 | Swarbrick et al. |
| 10,628,622 | B1* | 4/2020 | Sivaraman .............. G06F 30/33 |
| 10,691,580 | B1* | 6/2020 | Kasat .................... G06F 11/364 |
| 2003/0167348 | A1 | 9/2003 | Greenblat |
| 2003/0172189 | A1 | 9/2003 | Greenblat |
| 2005/0080610 | A1* | 4/2005 | Toma .................... G06F 30/33 |
| | | | 703/22 |
| 2015/0154337 | A1 | 6/2015 | Fang |
| 2016/0077997 | A1* | 3/2016 | Froese .................... G06F 9/54 |
| | | | 709/212 |
| 2017/0177753 | A9* | 6/2017 | Darbari ............... G06F 30/3323 |
| 2018/0330467 | A1* | 11/2018 | Park .................... G06F 3/0659 |

OTHER PUBLICATIONS

Cheung et al. "Runtime Deadlock Analysis of SystemC Designs" 2006 IEEE International High Level Design and Test Workshop; DOI: 10.1109/HLDVT.2006.319990 [retrieved on Aug. 6, 2024] (Year: 2006).*

Cho, M. et al., "BoxRouter: A New Global Router Based on Box Expansion and Progressive ILP," In ACM Proc. of DAC 2006, Jul. 24-28, 2006, pp. 373-378.

Wood, R. et al., "FPGA Routing and Routability Estimation via Boolean Satisfiability," IEEE Transactions on Very Large Scale Integration (VLSI) Systems, vol. 6, No. 2, Jun. 1998, 10 pg.

Nam, G. et al., "A New FPGA Detailed Routing Approach via Search-Based Boolean Satisfiability," IEEE Transactions on Computer-Aided Design of Intergrated Circuits and Systems, vol. 21, No. 6, Jun. 2002, 11 pg.

McMurchie, L. et al., "PathFinder: A Negotiation-Based Performance-Driven Router for FPGAs," In Proc. ACM/IEEE Int'l. Sym. Field Programmable Gate Arrays, Feb. 1995, 7 pg.

Nam, G. et al., "A Comparative Study of Two Boolean Formulations of FPGA Detailed Routing Constraints," IEEE Trans. on Computers, vol. 53, No. 6, Jun. 2004, 9 pg.

Fraisse, H. et al., "Boolean Satisfiability-Based Routing and Its Applicaiton to Xilinx UltraScale Clock Network," In Proc. of 2016 ACM/SIGDA Int'l. Sym. on Fieldl-Programmable Gate Arrays, Feb. 2016, 6 pg.

Hu, J. et al., "Sidewinder: A Scalable ILP-Based Router," In Proc. of 2008 Int'l. Workshop on System Level Interconnect Prediction, Apr. 5-8, 2008, 7 pg.

Dally, W.J. et al., "Deadlock-Free Message Routing in Multiprocessor Interconnection Networks," In IEEE Trans. on Computers, vol. 36, No. 5, May 1987, pp. 547-553.

* cited by examiner

INTER-KERNEL DATAFLOW ANALYSIS AND DEADLOCK DETECTION

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to dataflow analysis and deadlock detection for a design to be implemented in an IC.

BACKGROUND

A system with some degree of concurrency or parallelism may experience a deadlock condition. A deadlock is a state in which each member of a group of elements or subsystems of a system is stuck waiting for a resource to be provided from another member of the group. An example of a deadlock is a circular wait. For purposes of illustration, consider a circular wait example with members of a system M1, M2, M3, and M4. With a circular wait type of deadlock, M1 may be waiting for a resource from M2. M2 may be waiting for a resource from M3. M3 may be waiting for a resource from M4. M4 may be waiting on a resource from M1. Thus, the entire group is effectively stuck in a wait state waiting for a resource to be provided. The system effectively comes to a halt.

In the case of a design intended for implementation within an integrated circuit, such a deadlock may occur where the design may be represented as a dataflow network including multiple circuit blocks or kernels as the members of the group. Deadlocks generally arise when the processes of a kernel are blocked due to one or more empty and/or full first-in-first-out (FIFO) communication channels that link the processes and/or kernels. Unfortunately, detecting and diagnosing the occurrence of a deadlock is a difficult and time-consuming problem.

SUMMARY

In an example implementation, a method can include, for each kernel of a plurality of kernels of a design, including, using computer hardware, a signal in the kernel that is asserted in response to all processes inside the kernel stalling, wherein the plurality of kernels form a strongly connected component. The method can include, for each kernel of the plurality of kernels, asserting the signal during operation of the design in response to each process in the kernel stalling. The method also can include generating a notification that the strongly connected component is deadlocked in response to each kernel of the strongly connected component asserting the signal.

A system includes a processor configured to initiate operations. The operations can include, for each kernel of a plurality of kernels of a design, including a signal in the kernel that is asserted in response to all processes inside the kernel stalling, wherein the plurality of kernels form a strongly connected component. The operations can include, for each kernel of the plurality of kernels, asserting the signal during operation of the design in response to each process in the kernel stalling. The operations also can include generating a notification that the strongly connected component is deadlocked in response to each kernel of the strongly connected component asserting the signal.

In another example implementation, a method can include, determining, using computer hardware, a maximum depth for each of a plurality of First-In-First-Out (FIFO) channels of a design by performing a high-level programming language simulation of the design. The method can include monitoring operation of the design for a deadlock with depths of the plurality of FIFO channels of the design set to the maximum depths, wherein the monitoring is performed by a hardware description language simulation of the design or a hardware prototyping of the design. The method also can include outputting a notification indicating adequacy of the plurality of FIFO channels based on the monitoring.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to dataflow analysis and deadlock detection for a design to be implemented in an IC. Within designs that implement a dataflow network using blocking data stream accesses, deadlocks may occur when a cycle of processes is blocked due to empty and/or full first-in-first-out (FIFO) channels that implement the data streams. Deadlocks may arise in a design due to a number of different reasons such as, for example, FIFO channel sizing errors and data rate mismatches. Within this disclosure, the term "FIFO channel" refers to a communication channel of an electronic system, e.g., a circuit, that is capable of conveying a data stream and that operates in a "first-in-first-out" order. In general, a FIFO channel is ultimately implemented in an electronic system as a memory configured to operate according to the FIFO paradigm. Also, within this disclosure, the term "size" and "depth," as applied to a FIFO channel, are used interchangeably.

In accordance with the inventive arrangements described within this disclosure, methods, systems, and computer program products are provided that are capable of detecting the occurrence of a deadlock within a design for an IC. The deadlock may be detected using hardware description language (HDL) simulation and/or using hardware prototyping. Methods, systems, and computer program products also are provided for sizing FIFO channels within a design to avoid design errors and/or identify errors in an Electronic Design Automation (EDA) system also known as "tool errors." Further, methods, systems, and computer program products are provided for sizing FIFO channels to improve or optimize performance of a design by monitoring depths and blockages of such channels during HDL simulation.

Figure 1:
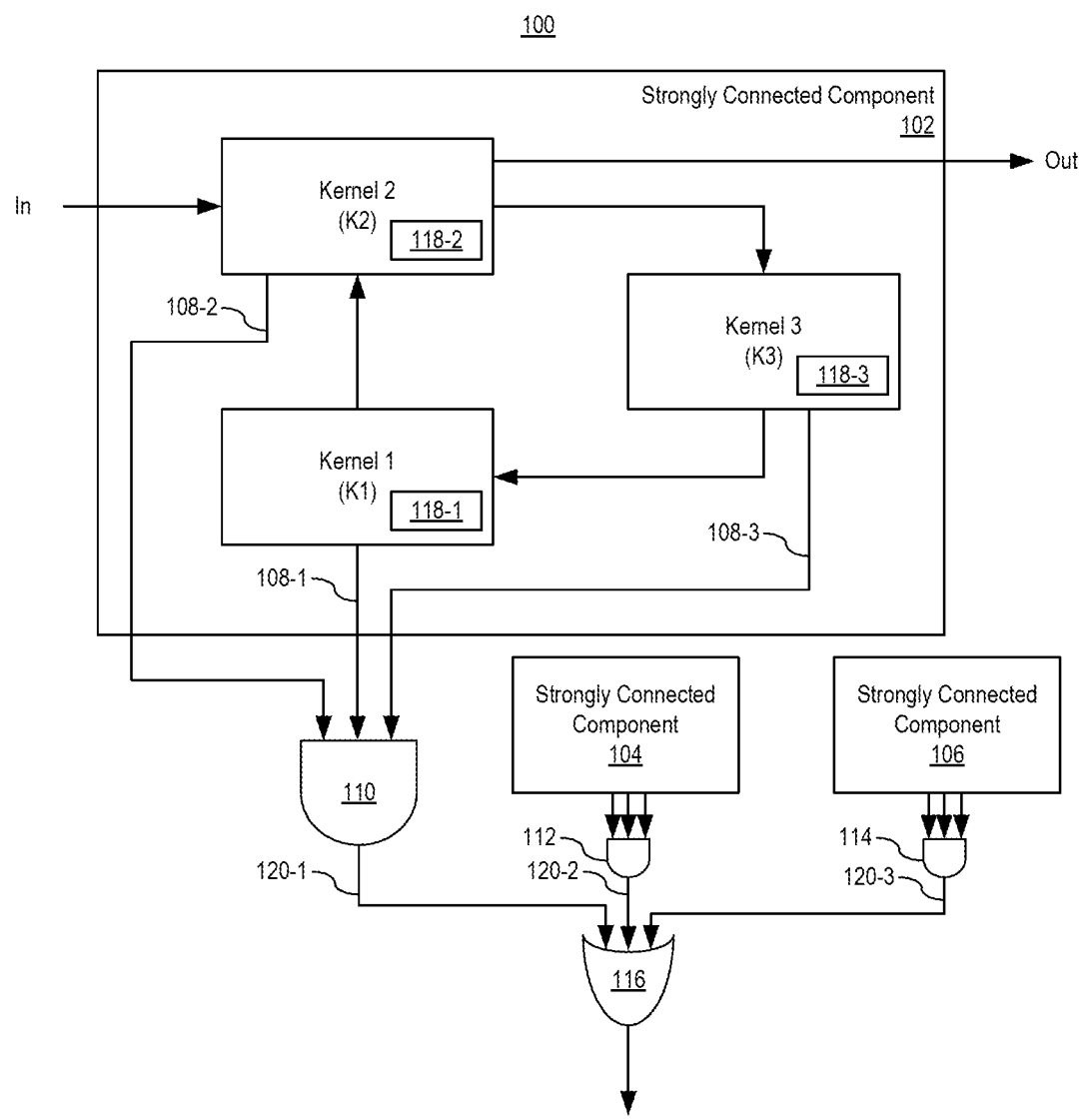
FIG. 1 illustrates an example design configured to detect the occurrence of a deadlock.

FIG. 1 illustrates an example design 100 configured to detect the occurrence of a deadlock. In the example, design 100 has been modified to include additional circuitry that facilitates detection of deadlocks. Deadlocks may arise in a design due to a number of different reasons such as, for example, FIFO channel sizing errors and data rate mismatches. A FIFO channel sizing error means that the FIFO channel has insufficient depth to store all of the values written by a data producer before the data consumer has had a chance to read the data. An example of a data rate mismatch includes the data producer not producing a sufficient amount of data such that the data consumer stalls (e.g., stops operating or execution) while awaiting data from the data producer, thereby potentially causing a deadlock if the stalled consumer prevents, through some other FIFO channel that is full, the producer from generating data. Another example of a data rate mismatch includes the data producer producing too much data resulting in a FIFO being full, thereby causing a deadlock.

Design 100 specifies a circuit that is intended for implementation in an IC. The IC may be an Application Specific IC (ASIC), a programmable IC, a System-on-Chip (SoC), or other type of IC. Design 100 may be specified in any of a variety of different formats. For example, design 100 may be specified in an HDL, as a netlist, or initially using a high-level programming language (HLPL) that is converted into HDL.

As defined herein, the term "high-level programming language" or "HLPL" means a programming language, or set of instructions, used to program a data processing system where the instructions have a strong abstraction from the details of the data processing system (e.g., machine language). For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) of a data processing system. Examples of high-level programming languages include, but are not limited to, C, C++, SystemC, OpenCL C, or the like.

As defined herein, the term "hardware description language" or "HDL" is a computer-language that facilitates the documentation, design, and manufacturing of a digital system, such as an IC. An HDL may be expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high-level programming languages, an HDL also includes an explicit notion of time, e.g., clocks and/or clock signals, which is a primary attribute of a digital system. For example, a circuit design specified in an HDL may describe the behavior of a circuit as data transfers occur between registers of the circuit each clock cycle. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax. Thus, a design specified in HDL may be an RTL design and an HDL simulator may be an RTL simulator.

In one aspect, design 100 may be modified using an EDA system, as described in greater detail below. Operation of design 100 for deadlock detection, as modified, may be observed through HDL simulation or through hardware prototyping. The HDL simulation may be performed by the EDA system. The EDA system may also be used to communicate with an IC in which design 100 is implemented where hardware prototyping is used.

The EDA system may be implemented as a computer system executing suitable software. Throughout this disclosure, while an EDA system is used for purposes of description, it should be appreciated that one or more operations attributed to the EDA system may be performed by the EDA system while one or more other operations also attributed to the EDA system may be performed by another, different computing system. A "host" system is another example of a computer system that is communicatively linked to an IC. Accordingly, for ease of description, operations attributable to a computer system are described herein as being performed by the EDA system herein though such operations may be performed by one or more different computer systems.

Design 100 includes one or more strongly connected components 102, 104, and 106. A strongly connected component is a collection of one or more kernels and/or processes of a design, when represented as a directed graph, where each vertex is reachable from each other vertex. In the mathematical theory of directed graphs, a graph is said to be strongly connected if every vertex is reachable from every other vertex. Strongly connected components 102, 104, and 106 may include one or more kernels with each kernel including one or more processes. For example, strongly connected component 102 includes kernels 1, 2, and 3 (e.g., K1, K2, and K3). In one aspect, a kernel refers to a user-specified portion or unit of design 100. Each kernel may include one or more functions (e.g., processes). For purposes of illustration, kernels within strongly connected components 104, 106 are not shown. In the example of FIG. 1, strongly connected components 104, 106 do not exchange data with strongly connected component 102 and are not synchronized with a host data processing system (not shown) that may be in communication with design 100 as implemented in an IC.

A deadlock may be detected among kernels of design 100 by augmenting the kernels with additional capabilities that allow the kernels to generate a notification, e.g., a signal, in response to all processes within the kernel being deadlocked or stopped. In accordance with the inventive arrangements described within this disclosure, an EDA system is capable of modifying each kernel of design 100 to include a signal 108 that indicates when all processes inside of the kernel are stalled. Signal 108 may be a top-level signal or wire. For purposes of discussion, the signal 108 may be referred to as the "ap_all_blocked" signal. Signal 108, as generated by a kernel, may be asserted in response to all processes within the kernel being stalled due to the following conditions:

Either an output FIFO channel or synchronization stream or top-level data stream is full; or An input FIFO channel or top-level data stream is empty.

Synchronization streams refer to block level signals that may be implemented as part of an interface between two kernels (e.g., blocks) of design 100. Synchronization streams, for example, are capable of indicating when a kernel is ready to start processing data, when the kernel is ready to accept new input (e.g., data), when the kernel has completed operation, and when a downstream block (e.g., component) that consumes the output data from the kernel is ready for new data inputs. If the downstream block is not able to consume new data inputs, the synchronization streams indicate this condition which prevents upstream blocks from generating additional data. The upstream blocks, for example, stop operating. The foregoing conditions for asserting signal 108 of a kernel do not include cases where the kernel has not been started or the kernel is executing purely sequential program code. Accordingly, for ap_all_blocked of a kernel to be asserted, at least one dataflow region must be active and the dataflow region must include at least one blocked top-level FIFO channel.

Signals 108 of strongly connected component 102 may be logically ANDed together using AND gate 110. The EDA system is capable of inserting signals 108 within design 100 and AND gate 110. In one aspect, signals 108 for each strongly connected component may be ANDed together. The EDA system is capable of inserting AND gates 112, 114 for strongly connected components 104, 106, respectively. The EDA system may also insert OR gate 116 into design 100. OR gate 110 is capable of performing a logical OR on the signals received from AND gates 110, 112, and 114. Anytime one of the signals output from an AND gate 110, 112, or 114 occurs, a deadlock is detected by the EDA system. A host computing system, whether the EDA system or another computer system, is capable of monitoring signals 120 and/or the signal output from OR gate 116 to detect interkernel deadlocks. In one aspect, signals 120 and/or the output from OR gate 116 may be provided to the EDA system as an interrupt signal. That is, the signals may generate an interrupt to program code executed by the EDA system.

In one aspect, the EDA system is capable of further modifying design 100 to include, for each kernel of a strongly connected component, a data structure configured to track blocked data streams for the kernel. The data structure may be referred to as a blocking matrix. In the example of FIG. 1, each of kernels K1, K2, and K3 has a respective blocking matrix 118. Each blocking matrix 118 may be implemented as a bidimensional matrix of FIFO channel blocking status register bits for a particular kernel.

In one aspect, the EDA system executes host program code in combination with simulating design 100 using an HDL simulator. In that case, the HDL simulation may raise an interrupt with the host program code in response to any one of AND gates 110, 112, and/or 114 asserting signal 120. In another aspect, where design 100 is observed through hardware prototyping, the EDA system executes the host program code and is in communication with an IC in which design 100 is implemented. Assertion of any one or more of signals 120 raises an interrupt with the host program code of the EDA system via a communication channel linking the IC with the EDA system.

For example, the host program code, as executed by the EDA system, is capable of continuously monitoring for an interrupt generated by the HDL simulation or the IC in the case of hardware prototyping for assertion of one or more of signals 120. In response to detecting a deadlock as indicated by assertion of one or more of signals 120, the EDA system is capable of initiating a reporting module (not shown) that may be inserted in design 100 by the EDA system when modifying design 100. The reporting module is capable of outputting the values stored in blocking matrices 118 of the blocked strongly connected component(s) to the EDA system as blocking status data. Further, the EDA system may stop the simulation or hardware prototyping as the case may be in response to detection of a deadlock. In cases where hardware prototyping is used, blocking matrices 118 may be implemented as registers or memories within the IC that may be read by the EDA system in response to detecting a deadlock as indicated by one or more of signals 120.

Figure 2:
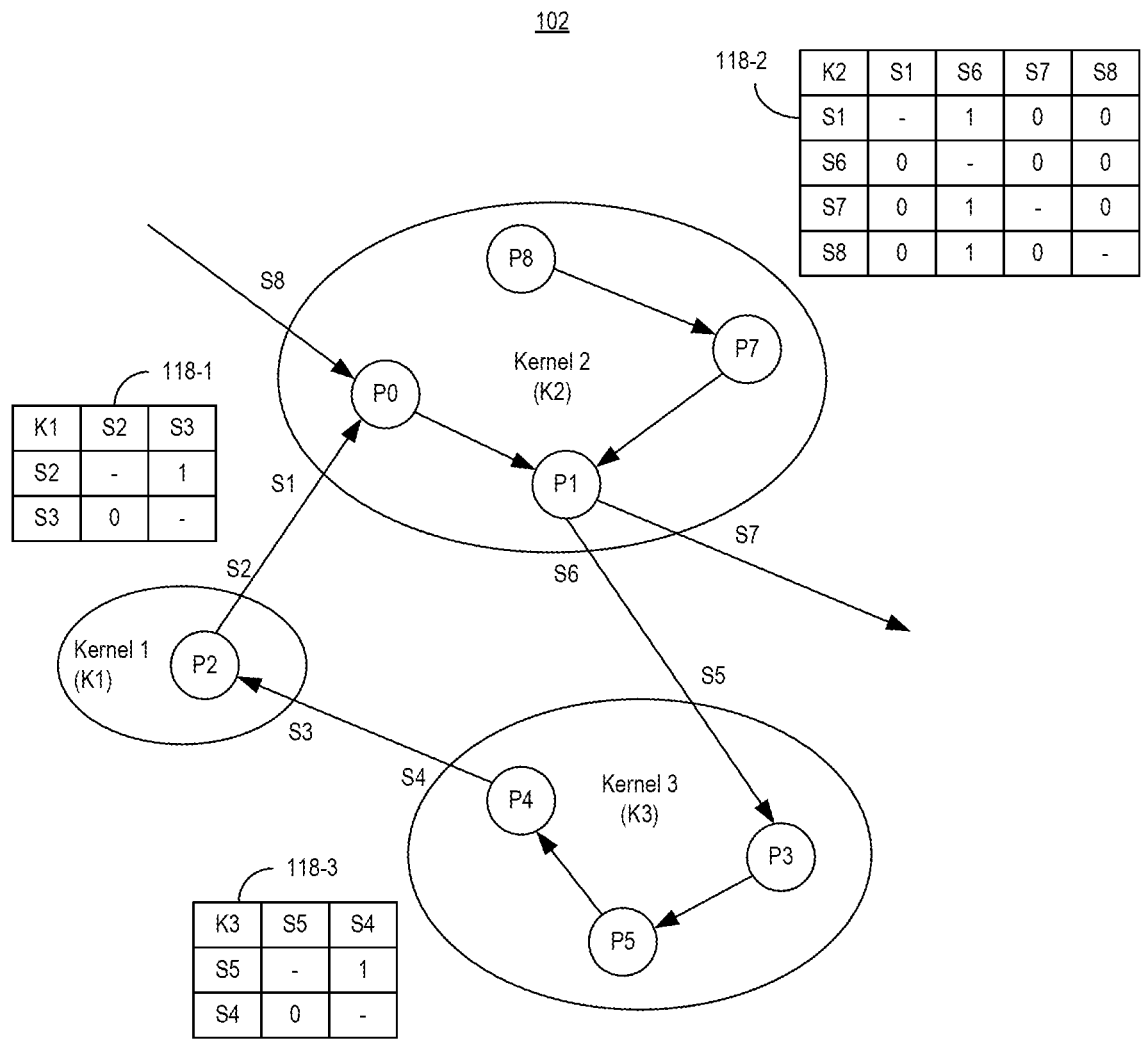
FIG. 2 illustrates a more detailed example of a strongly connected component of the design of FIG. 1.

FIG. 2 illustrates a more detailed example of strongly connected component 102 of design 100. FIG. 2 illustrates the various processes within kernels K1, K2, and K3 as well as the FIFO channels connecting the processes. As pictured, kernel K1 includes process 2 (P2). Kernel K2 includes processes 0, 1, 7, and 8 (P0, P1, P7, and P8). Kernel K3 includes processes 3, 4, and 5 (P3, P4, and P5). Processes (and kernels) are interconnected by FIFO channels. For example, P2 is connected to P0 via FIFO channels S2, S1. P1 is connected to P3 via FIFO channels S6 and S5. Process P4 is connected to process P2 via FIFO channels S4 and S3.

In the example of FIG. 2, each of block matrices 118 includes one bit blocked_k(s1, s2) for each pair of FIFO channels s1, s2 in the interface of kernel k. The bit is set to 1 if s2 blocks s1 inside kernel k. Referring to blocking matrix 118-1, for example, it may be seen that the bit (S3, S2) is set to one indicating that FIFO channel S2 blocks FIFO channel S3.

In one aspect, at each clock cycle of the HDL simulation or hardware prototyping, the kernel k is configured to set the bit blocked_k(s1, s2) in blocking matrix 118 if:

Either a first process reads from a FIFO channel and the FIFO channel is full; or, the first process writes to the first FIFO channel and the first FIFO channel is empty; and The first process is blocked by a second process; and Either the second process writes to a second FIFO channel and the second FIFO channel is full; or, the second process reads from the second FIFO channel and the second FIFO channel is empty.

Figure 3:
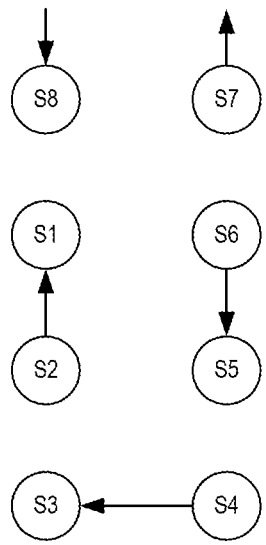
FIG. 3 illustrates an example of a kernel stream graph for the design of FIG. 1.

FIG. 3 illustrates an example of a kernel stream graph 300 for design 100. The EDA system is capable of generating kernel stream graph 300 from design 100. In the example of FIG. 3, kernel stream graph 300 shows the data streams of strongly connected component 102. In the example, only those FIFO channels that are connected based on known kernel connectivity are connected. For example, kernel stream graph 300 shows that FIFO channel S2 is connected to FIFO channel S1. FIFO channel S6 is connected to FIFO channel S5. FIFO channel S4 is connected to FIFO channel S3. The EDA system is capable of generating kernel stream graph 300 based on defined FIFO channels between kernels within design 100 (e.g., the source code, whether HLPL or HDL).

In one aspect, the EDA system obtains kernel stream graph 300 and uses kernel stream graph 300 in combination with the blocking status data output from the HDL simulation or the hardware prototyping, as the case may be, to confirm that a deadlock has occurred during simulation and provide more detailed analysis of any detected deadlock. The EDA system is further capable of displaying the reason for the deadlock. More particularly, the EDA system may generate and display or output a list of the kernels, processes, and/or FIFO channels involved in the deadlock. In general, the EDA system utilizes the blocking status data to update the connections of kernel stream graph 300. In the case where the EDA system updates the kernel stream graph 300 so that a cycle is formed, the EDA system determines that a deadlock has been detected from the HDL simulation or the hardware prototyping.

Figure 4:
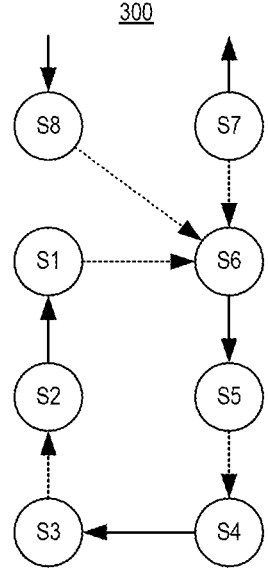
FIG. 4 illustrates a state of the kernel stream graph of FIG. 3 subsequent to adding connections based on blocking status data.

FIG. 4 illustrates a state of kernel stream graph 300 subsequent to the EDA system adding connections based on the blocking status data. Connections added in FIG. 4 based on the blocking status data are indicated with dotted arrows. Referring to FIGS. 3 and 4 in combination, the EDA system adds the connection between FIFO channel S1 and FIFO channel S6 in response to the bit in block matrix 618-2 (S6, S1) specifying that FIFO channel S6 blocks FIFO channel S1. The EDA system adds the connection between FIFO channel S7 and FIFO channel S6 in response to the bit in block matrix 618-2 (S6, S7) specifying that FIFO channel S7 blocks FIFO channel S6. The EDA system adds the connection between FIFO channel S8 and FIFO channel S6 in response to the bit in block matrix 618-2 (S6, S8) specifying that FIFO channel S8 blocks FIFO channel S6.

The EDA system adds the connection between FIFO channel S5 and FIFO channel S4 in response to the bit in block matrix 618-3 (S4, S5) specifying that FIFO channel S5 blocks FIFO channel S4. The EDA system adds the connection between FIFO channel S3 and FIFO channel S2 in response to the bit in block matrix 618-1 (S3, S2) specifying that FIFO channel S2 blocks FIFO channel S3.

Subsequent to updating kernel stream graph 300, the EDA system is capable of detecting the cycle (e.g., a closed loop) formed therein of FIFO channel S1, to FIFO channel S6, to FIFO channel S5, to FIFO channel S4, to FIFO channel S3, to FIFO channel S2, and back to FIFO channel S1. In this way, the EDA system, in response to detecting the cycle, determines that a deadlock in the HDL simulation or the hardware prototyping did occur and can report the involved kernels, processes, and FIFO channels from design 100. The kernels, processes, and FIFO channels involved in the deadlock include those that form the closed loop in updated kernel stream graph 300.

Figure 5A:
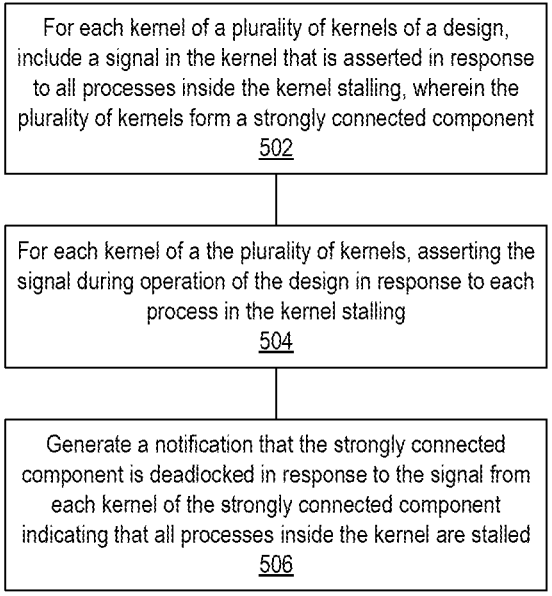
FIGS. 5A and 5B illustrate example methods of determining whether a deadlock occurred during operation of a design.
Figure 5B:
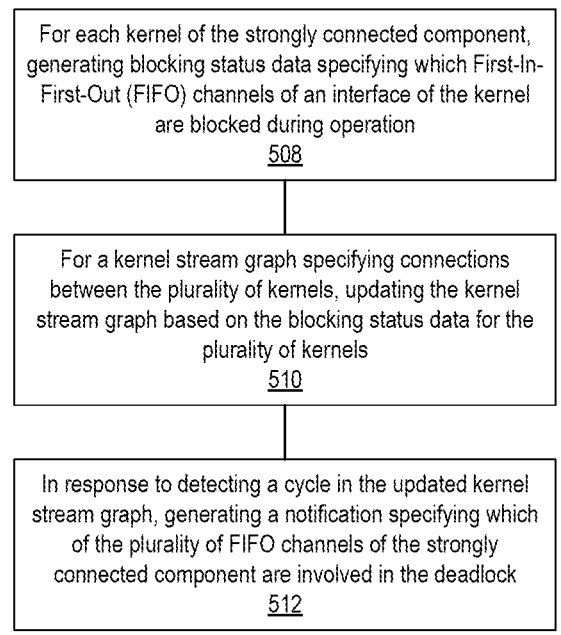

FIGS. 5A and 5B illustrate example methods of determining whether a deadlock occurred during operation of a design. FIG. 5A describes an example method for detecting a deadlock in a design. In block 502, for each kernel of a plurality of kernels of a design, an EDA system includes a signal, e.g., signal 108, in the kernel. The signal is asserted in response to all processes inside the kernel stalling. Further, the plurality of kernels form a strongly connected component (e.g., strongly connected component 102). In block 504, for each kernel of the plurality of kernels, the signal is asserted during operation of the design in response to each process in the kernel stalling. As an example, each of kernels K1, K2, and K3 of strongly connected component 102 may assert their respective signals 108. In one aspect, operation of the design is performed by HDL simulation. In another aspect, operation of the design is performed by hardware prototyping.

In block 506, a notification is generated that the strongly connected component is deadlocked in response to each kernel of the strongly connected component asserting the signal. The notification may be the assertion of signals 120 and/or the assertion of the signal output from OR gate 116. The notification may be generated, as an interrupt, from the HDL simulation or from an IC in which the design is at least partially implemented in the case of hardware prototyping.

FIG. 5B illustrates another example of deadlock detection and of performing a more detailed analysis of a detected deadlock. In block 508, for each kernel of the strongly connected component, blocking status data is generated. The blocking status data specifies which FIFO channels of an interface of the kernel are blocked during operation. The operation of the design may be via HDL simulation or hardware prototyping.

In one aspect, each kernel of the plurality of kernels includes a blocking matrix configured to store the blocking status data of the kernel. Example blocking matrices 118 are illustrated in FIG. 2.

In the case of HDL simulation, the blocking matrices 118 may be implemented as one or more data structures within the EDA system. The HDL simulation generates the blocking status data and stores the data in the data structures. For example, the added signals may be HDL signals included in the HDL simulation. In response to signal 120-1 being asserted, the HDL simulation may generate an interrupt. In response to the interrupt, the EDA system, e.g., an analysis program executing therein, may read the blocking status data for the kernels of the strongly connected component.

In the case of hardware prototyping, the blocking matrices may be implemented as registers or memories in the IC with the blocking status data being generated during hardware prototyping and stored in the respective blocking matrices. Each blocking matrix 118 may be kernel specific such that each kernel has a register that is configured to the store blocking status data for that kernel. In hardware prototyping, signal 120-1 is implemented as an actual wire within the IC in which design 100 (or portion thereof including the strongly connected component) is implemented. In that case, the IC may be coupled to the EDA system by way of a communication channel such as a Peripheral Component Interconnect Express (PCIe) communication link. Assertion of signal 120-1 may cause an interrupt to be conveyed via the communication link from the IC (e.g., as disposed on a suitable circuit board coupled to the EDA system or a card installed in an available bus slot of the EDA system) to the EDA system (e.g., the host program code or analysis program). The EDA system, in response to the interrupt, may read the blocking status data for the kernels of the strongly connected component from the respective registers of the IC over the communication link. In one aspect, the IC is capable of generating the interrupt to the computer hardware in response to each kernel of the strongly connected component stalling (e.g., as indicated by signal 120-1). In that case, the obtaining may include the computer hardware reading the blocking status data for the kernels from the IC.

Accordingly, in either case, in response to each kernel of a strongly connected component stalling, the blocking status data for each kernel of the strongly connected component may be obtained.

In block 510, for a kernel stream graph specifying connections between the plurality of kernels, the EDA system is capable of updating the kernel stream graph based on the blocking status data for the plurality of kernels. In one aspect, the EDA system updates the kernel stream graph by adding edges to the kernel stream graph corresponding to blockages specified by the blocking status data. An example kernel stream graph is illustrated in FIG. 3. An example of updating the kernel stream graph is illustrated in FIG. 4. In block 512, in response to detecting a cycle in the updated kernel stream graph, the EDA system is capable of generating a further notification specifying a list of the kernels, processes, and/or FIFO channels of the strongly connected component that are involved in the deadlock.

In one aspect, the operations described in connection with FIGS. 5A and 5B may be performed independently of one another. In another aspect, the operations of FIGS. 5A and 5B may be performed in combination with one another. For example, the operations described in connection with FIG. 5A and FIG. 5B may be performed concurrently or substantially concurrently such that blocking status data is generated during operation and obtained in response to detection of a deadlock as described in connection with FIG. 5A.

FIGS. 1-5 describe inventive arrangements for detecting deadlocks in a design. In one or more example implementations, a designer may use the techniques illustrated in FIGS. 1-5 iteratively where the size of FIFO channels of the design is increased between successive iterations of deadlock detection. By increasing the size of the FIFO channels of the design, the deadlock may, at some point, be removed. That is, the designer may increase the size of the FIFO channels of the design, observe operation of the design as described, and continue iterating until such time that the deadlock no longer occurs. This type of approach may be used to remove deadlocks arising from FIFO channel sizing errors.

A FIFO channel sizing error may be a "tool error" where the EDA system (e.g., a High-Level-Synthesis application executed by the EDA system) automatically sizes the FIFO channels and does so incorrectly. A FIFO channel sizing error also may be due to human error where a user sizes the FIFO channels of the design incorrectly. Human error in FIFO channel sizing is considered a "design error." In either case, the FIFO channel(s) of the design is/are too small to handle the amount of data traversing through. As noted, a channel sizing error may be addressed, e.g., fixed, by using a larger FIFO channel. By comparison, a deadlock arising from a data rate mismatch, unlike a FIFO channel sizing error, may not be fixed or resolved by using a larger FIFO channel.

Accordingly, as discussed, methods, systems, and computer program products are provided herein for automatically sizing FIFO channels to avoid deadlocks arising from FIFO channel sizing errors. The FIFO channel sizing techniques also may be used to determine whether a deadlock detected within a design is due to human error (e.g., a design error) or a tool error. Knowing the underlying cause of a deadlock allows the deadlock to be addressed more effectively. In one aspect, the FIFO channel sizing techniques may be used in combination with the techniques described in connection with FIGS. 1-5 that detect a deadlock to determine whether the deadlock is due to a design error or a tool error. The FIFO channel sizing techniques also may be used in lieu of the iterative and manual FIFO sizing technique described above.

Figure 6:
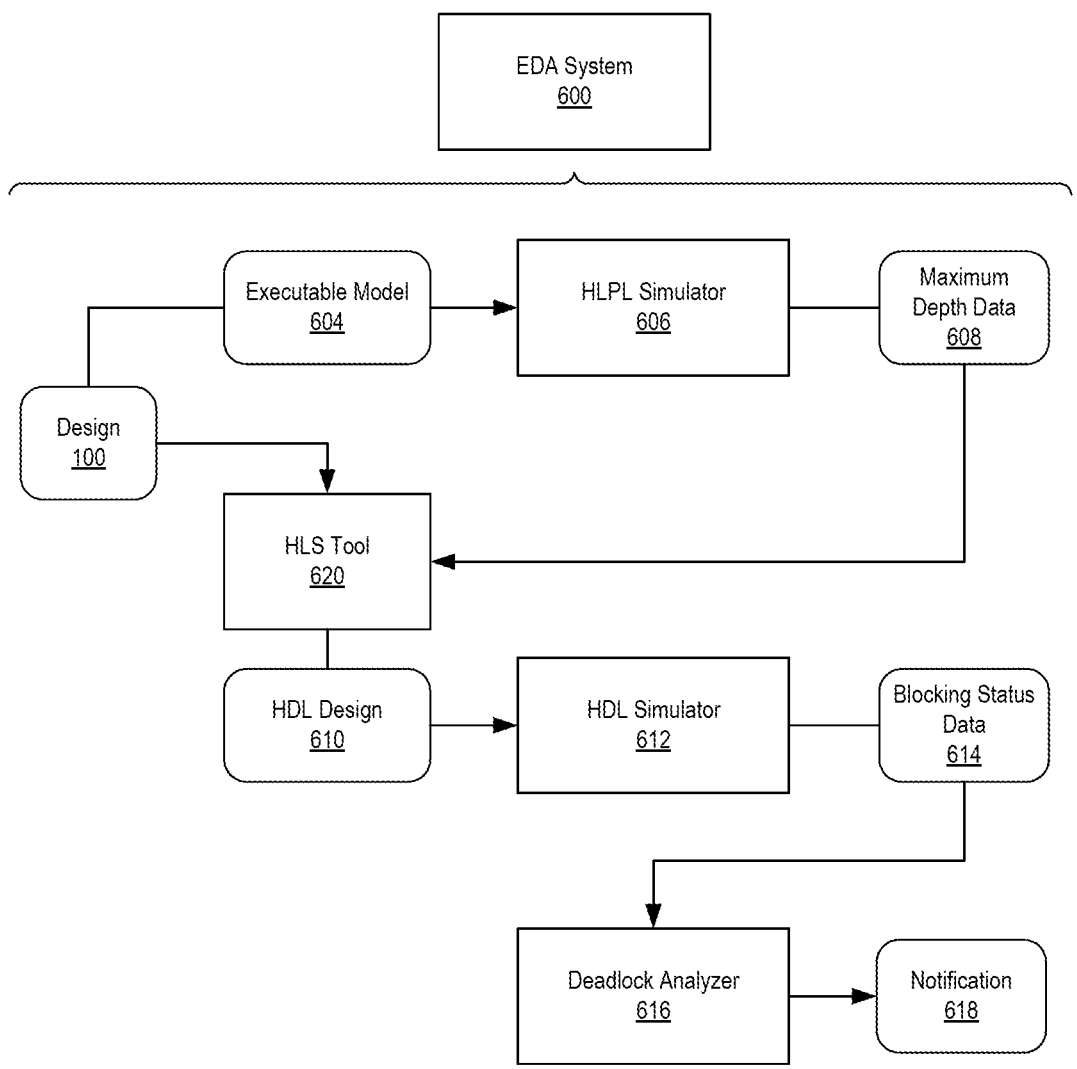
FIG. 6 illustrates an example First-In-First-Out (FIFO) channel sizing technique.

FIG. 6 illustrates an example FIFO channel sizing technique performed using HLPL simulation and HDL simulation. The HLPL simulation and HDL simulation may be performed by an EDA system 600. EDA system 600 may be implemented as a data processing system, e.g., a computer, executing suitable operational software or program code to perform one or more of the operations described within this disclosure. An example of a data processing system that may be used to implement an EDA system such as EDA system 600 is described in connection with FIG. 11.

Within the field of circuit design, deadlock avoidance is an undecidable problem that may not be solved algorithmically. In accordance with the inventive arrangements described herein, EDA system 600 provides a solution that takes a different approach that includes various types of simulation and/or hardware prototyping. FIG. 6 illustrates an example approach for determining whether a deadlock observed in a design is due to a FIFO channel sizing error that may be resolved by modifying the size of one or more FIFO channels or is due to a data rate mismatch that requires other changes to the design. Further, FIG. 6 illustrates an example approach that is capable of indicating whether a FIFO channel sizing error is a design error or a tool error. In some cases, a tool error may be overcome through inclusion of one or more pragmas (e.g., compiler directives) in the design itself that may override the default behavior of an HLS tool such as HLS tool 620 of EDA system 600. In other cases, a tool error may be reported to the entity responsible for development of the tool so that it may be corrected. The inventive arrangements allow a user with little or no experience with HDL to run simulations to determine the cause of the deadlock.

In the example of FIG. 6, design 100 is intended for implementation in an IC. The IC may be an ASIC, a programmable IC, an SoC, or other type of IC. Design 100 may be specified in an HLPL, e.g., as source code. A deadlock may have been observed within an IC in which design 100 has been implemented or within a simulation of design 100.

In one aspect, where design 100 is specified in an HLPL as source code, design 100 may be compiled into executable program code shown as executable model 604. HLPL simulator 606 is capable of performing an HLPL simulation using a set of input vectors from an HLPL testbench. The input vectors of the HLPL testbench may also be used for HDL simulation. During the HLPL simulation, HLPL simulator 606 is capable of executing executable model 604 using unrestricted FIFO channel sizes. That is, the FIFO channel sizes between processes and/or kernels of design 100 are not bounded or limited in size. During the HLPL simulation, a maximum depth count may be determined for each of the FIFO channels of design 100.

In one aspect, the maximum depth counts may be determined by configuring an hls::stream class used to create FIFO channels between processes to track the maximum depth of each FIFO channel by maintaining a static counter for each FIFO channel. For each FIFO channel, the counter of the FIFO channel is incremented in response to execution of a data stream write instruction for the FIFO channel. For each FIFO channel, the counter for the FIFO channel is decremented in response to execution of a data stream read instruction for the FIFO channel. In an example implementation, the maximum value obtained by each counter during HLPL simulation may be saved or stored as the maximum counter value for the FIFO channel. The resulting maximum counter values for the FIFO channels of design 100 at the end of HLPL simulation may be output as maximum depth data 608.

In one aspect, EDA system 600 is capable of evaluating the size and rate of growth of the FIFO channel during the HLPL simulation. In cases where design 100 includes a data rate mismatch for a FIFO channel, the size of the FIFO channel will continue to grow in an unbounded manner during the HLPL simulation. EDA system 600 is capable of detecting cases where the size of a FIFO channel continues to grow throughout the HLPL simulation or grow at a rate that exceeds some minimum and predetermined rate, as opposed cases where the FIFO channel(s) stabilize at a particular maximum size. In response to detecting that a FIFO channel continues to grow during HLPL simulation as described, EDA system 600 is capable of generating a notification to the user that the FIFO channel, e.g., the particular FIFO channel experiencing the growth, likely has a data rate mismatch. For example, EDA system 600 may generate a message that may be output as a file, displayed by a display device, or the like, that indicates the particular FIFO channel(s) observed to continue to grow throughout the HLPL simulation.

The maximum counter values for the respective FIFO channel may be used as minimum depths for the FIFO channels within an HDL version of design 100. For example, the maximum counter value for a FIFO channel from the HLPL simulation may be used as the minimum depth or size of that FIFO channel when simulating an HDL version of design 100 shown as HDL design 610. EDA system 600 may include HLS tool 620, which is capable of generating HDL design 610 from design 100. As illustrated in the example of FIG. 6, maximum depth data 608 may be provided to HLS tool 620 and used by HLS tool 620 to set the sizes of the respective FIFO channels of HDL design 610 to at least the size indicated for the respective FIFO channels from maximum depth data 608.

In performing HDL simulation of HDL design 610, HDL simulator 612 uses the same set of input vectors used by HLPL simulator 606 to simulate design 100 (e.g., execute executable model 604). Based on the HDL simulation, HDL simulator 612 is capable of outputting blocking status data 614. Deadlock analyzer 616 is capable of using blocking status data 614 to determine whether a deadlock occurred. In an example implementation, deadlock analyzer may be implemented as described in connection with FIGS. 1-5. Thus, HDL design 610 may be modified as described in connection with FIGS. 1-5 to generate blocking status data 614 during HDL simulation. In one aspect, deadlock analyzer 616 is capable of generating a notification 618 that indicates whether a deadlock occurred during the HDL simulation. Notification 618 may include additional information such as the particular kernels, processes, and/or FIFO channels involved in the deadlock.

Using maximum depth data 108 as described for purposes of HDL simulation ensures the absence of deadlock only if the following conditions are observed.

All pipelines inside dataflow processes must be flushing.
The order of scheduling of FIFO channel accesses within a process must be the same as the order of the FIFO channel accesses in the HLPL simulation. This condition may be verified by an analysis of a schedule report for design 100 generated by HLS tool 620 and may be enforced using various forms of scheduling constraints for the HDL simulation.
Only blocking reads and writes may be used. This also means that checking for FIFO channel empty or full is not allowed.

Accordingly, if a deadlock is detected during HDL simulation with the above conditions having been observed, the original deadlock detected in design 100 (e.g., prior to initiation of the process illustrated in FIG. 6), if HDL design 610 uses FIFO channel depths at least as large as indicated by maximum depth data 608, must be due to a tool error (e.g., an error of HLS tool 620). Notification 618 may indicate whether a deadlock occurred during HDL simulation, and, as such, whether the original deadlock was likely caused by tool error (e.g., caused by HLS tool 620).

Figure 7:
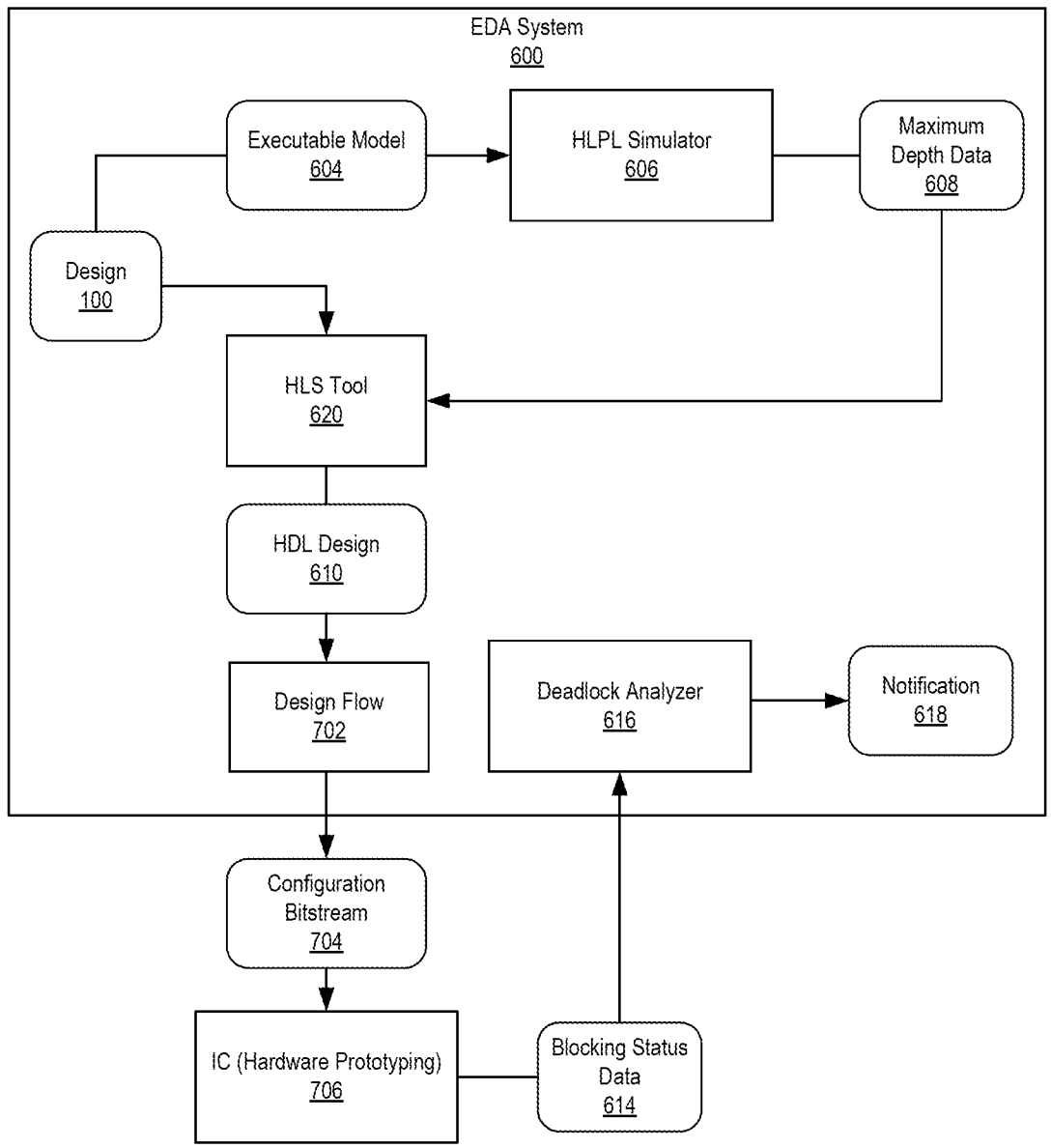
FIG. 7 illustrates another example FIFO channel sizing technique.

FIG. 7 illustrates another example FIFO channel sizing technique performed using HLPL simulation and hardware prototyping. In the example of FIG. 7, HDL simulation is replaced by hardware prototyping. In this regard, HDL design 610 is processed through a design flow 702 (e.g., synthesis, placement, routing, and configuration bitstream generation) to generate configuration bitstream 704. Configuration bitstream 704 is loaded into IC 706 to implement design 100 therein. As discussed, HDL design 610 (or design 100 as the case may be) may be modified as described in connection with FIGS. 1-5. In the example of FIG. 7, blocking status data 614 is output or read from IC 706 and provided to EDA system 600 for use and analysis by deadlock analyzer 616. Deadlock analyzer 616 may operate as described in connection with FIG. 6 to generate notification 618.

Figure 8:
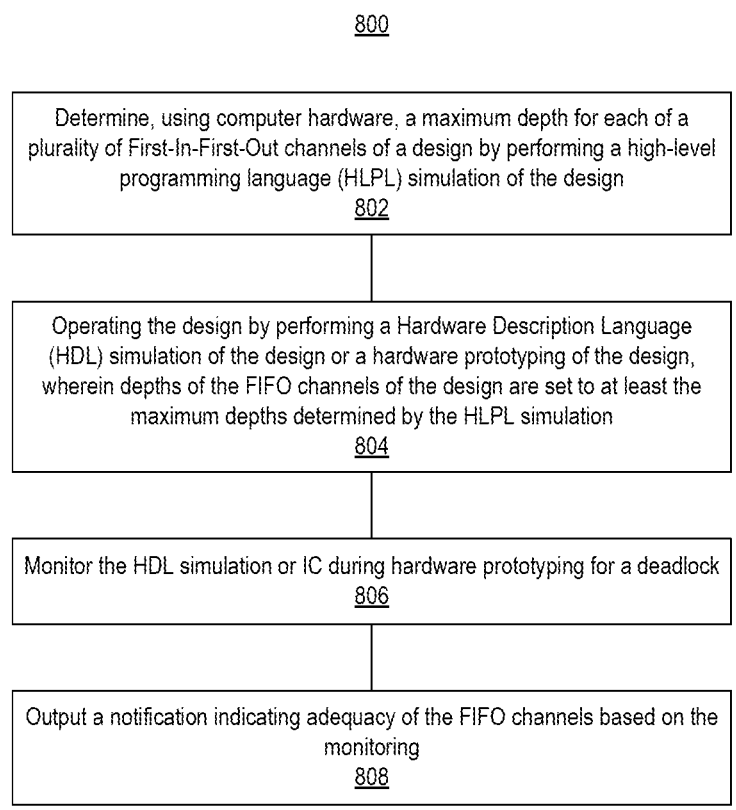
FIG. 8 is an example method illustrating certain aspects of FIFO channel sizing and deadlock analysis.

FIG. 8 is an example method 800 illustrating certain aspects of FIFO channel sizing and deadlock analysis. Method 800 may be implemented by EDA system 600 to determine whether a deadlock that is occurring within a design is due to an error in the design itself or an error in the EDA system or tool. Method 800 may begin in a state where a deadlock is suspected to have occurred in a design for an IC. The deadlock may have been detected through observation of operation of the design as implemented in an IC (e.g., in the field or hardware prototyping) or by observation of operation of the design using simulation (e.g., HLPL or HDL).

In block 802, EDA system 600 is capable of determining a maximum depth for each of a plurality of FIFO channels of design 100 by performing an HLPL simulation of design 100. In block 804, design 100 is operated by performing an HDL simulation of design 100 as shown in FIG. 6 or a hardware prototyping of design 100 as shown in FIG. 7.

In one aspect, the maximum depth for each of the plurality of FIFO channels may be determined by implementing a counter for each FIFO channel. For each FIFO channel, the counter is incremented in response to each write and decremented in response to each read. The counter is capable of preserving a maximum value stored therein during the HLPL simulation.

In another aspect, the HLPL simulation is performed using unbounded depths for the data streams.

In block 804, the depths of the FIFO channels of design 100 are set to at least the maximum depths as determined by the HLPL simulation. Each FIFO channel may be set to a size (e.g., depth) that is at least as large as the maximum depth determined for the corresponding FIFO channel in the HLPL simulation.

In block 806, EDA system 600 is capable of monitoring for a deadlock during operation of the design. For example, the design may be modified as described in connection with FIG. 1. EDA system 600 may monitor operation of the design for a notification (e.g., signals 120 or the output of OR gate 116), which may be received as an interrupt. As discussed, design 100 may be further modified as illustrated in FIG. 2 so that further analysis may be performed as illustrated in FIGS. 3 and 4 to determine more specific data relating to any detected deadlock. In block 808, EDA system 600 is capable of outputting a notification indicating adequacy of the FIFO channels based on the monitoring. The notification may indicate the particular kernels, processes, and/or FIFO channels involved in the deadlock.

For example, in response to EDA system 600 detecting a deadlock during the HDL simulation or the hardware prototyping, the notification indicates that a source of the deadlock is an EDA system issue (e.g., a tool issue). In response to EDA system 600 determining that no deadlock occurred during the HDL simulation or the hardware prototyping, the notification indicates that the FIFO channels are sized to avoid deadlocks.

In one or more other example implementations, the adequacy of the depths of the FIFO channels is indicated based on whether the size of the FIFO channels grew throughout the HLPL simulation or reached a stable (e.g., unchanging) maximum size.

The foregoing examples provided methods, systems, and computer program products directed to detecting deadlocks and sizing FIFO channels to avoid deadlocks in designs. The following description relates to sizing FIFO channels to improve or optimize performance of the design through monitoring depths and/or blockages during HDL simulation. The following methods, systems, and computer program products, for example, may be used following the detection and/or correction of a deadlock to adjust FIFO channel sizes for improved operation of the design. The FIFO channels sizes, for example, may be larger than needed to avoid deadlock and the following techniques may be applied to reduce FIFO channel sizes to a point where the design operates efficiently while still avoiding deadlocks. In other cases, FIFO channel sizes that cause temporary stalls but not deadlocks may be increased to remove the temporary stalls found in the design.

For example, EDA system 600 is capable of guiding a user to choose sufficient FIFO channel depths to solve design issues, as workarounds to address HLS tool or design issues. The user may also choose or select FIFO channel depths that improve performance of the design. With regard to improving performance, selecting suitable FIFO channel depths may not only avoid deadlocks, but may improve performance of the design by removing occurrences of a data producer trying to write to a full FIFO channel, which may not always result in a deadlock, but still slow performance.

Example 1 illustrates source code for an example design. In Example 1, the top-level function "example" calls two sub-functions called "proc_1" and "proc_2" that are dataflowed in HLS. This means that the two functions become concurrent processes that communicate via FIFO channels (e.g., via hls::streams). The "main" function is the testbench that drives the "top" multiple times.

Example 1

```
#include "example.h"
void example(hls::stream<int>& A, hls::stream<int>& B){
#pragma HLS dataflow
  hls::stream<int> data_channel1;
  hls::stream<int> data_channel2;
```

-continued

```
#pragma HLS stream depth=8 variable=data_channel1,data_channel2
  proc_1(A, data_channel1, data_channel2);
  proc_2(B, data_channel1, data_channel2);
}
void proc_1(hls::stream<int>& A, hls::stream<int>& data_channel1,
hls::stream<int>&
    data_channel2){
  int tmp;
  for(i = 0; i < 10; i++){
    tmp = A.read( );
    data_channel1.write(tmp);
  }
  for(int i = 0; i < 10; i++){
    data_channel2.write(tmp);
  }
}
void proc_2(hls::stream<int>& B, hls::stream<int>& data_channel1,
hls::stream<int>&
    data_channel2){
  for(int i = 0; i < 10; i++){
    int tmp = data_channel2.read( ) + data_channel1.read( );
    B.write(tmp);
  }
}
```

In Example 1, the producer "proc_1" produces 10 data items on the first FIFO channel (data_channel1) and then produces 10 data items on the second FIFO channel (data channel 2), while "proc_2" consumes the data items one by one. This means that the minimum depth of data_channel1 is 9, otherwise a deadlock will occur. A depth of 10 may provide improved performance by avoiding mismatched "burstiness" of accesses. The minimum depth of 9 may be determined since "proc_1" writes 9 values into data_channel1, with depth 8. In the meantime, e.g., concurrently, "proc_2" reads 1 value from data_channel1. Then "proc_1" blocks because data_channel1 is full. "Proc_2" starts attempting to read from data_channel2 and blocks because "proc_1" has not yet had a chance to write into data_channel2 thereby causing a deadlock. Example 1 is an example of a channel sizing error because with a FIFO channel of depth 9, "proc_1" may start writing into data_channel2 and "proc_2" may make progress.

Figure 9:
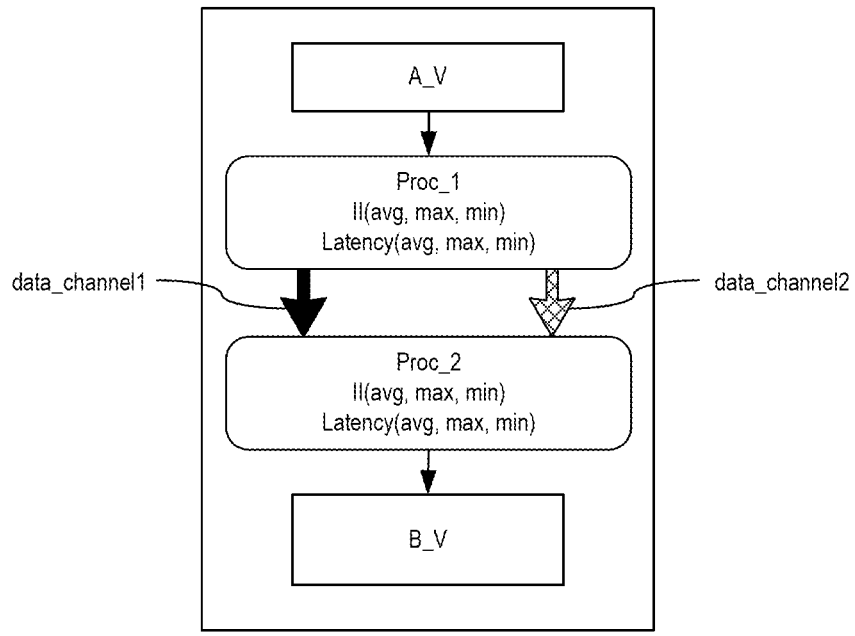
FIG. 9 illustrates an example view of a Graphical User Interface (GUI) that may be generated by an EDA system.

FIG. 9 illustrates an example view of a Graphical User Interface (GUI) that may be generated by EDA system 600. The GUI of FIG. 9 may be generated by EDA system 600 subsequent to performing HDL simulation of the design of Example 1. In the example of FIG. 9, the GUI provides a graphical view of proc_1 and proc_2 with data_channel1 and data_channel2 being illustrated as arrows. The solid black color of data_channel1 indicates that the FIFO channel is full, while the patterning of data_channel2 indicates that the FIFO channel is empty. By performing HLPL simulation as described on the design of Example 1, a maximum FIFO channel depth of 10 may be determined. By updating the HDL version of the design to use a minimum FIFO channel depth of at least 10, the HDL simulation executes without deadlock.

Figure 10:
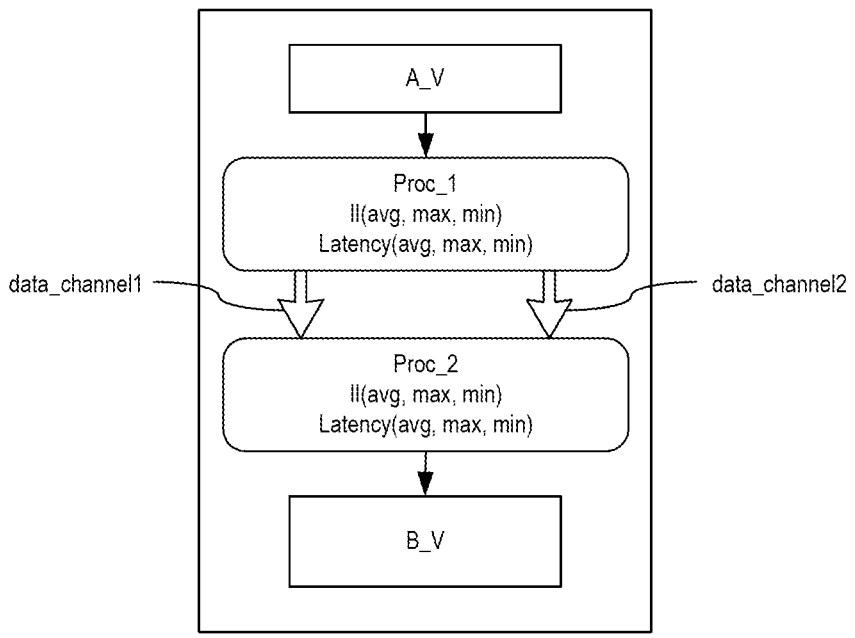
FIG. 10 illustrates another example view of a GUI that may be generated by an EDA system.

FIG. 10 illustrates another example view of a GUI that may be generated by EDA system 600. The GUI of FIG. 10 may be generated by EDA system 600 subsequent to performing HDL simulation of the design of Example 1 using the minimum FIFO channel depth of 10. In the example of FIG. 10, the solid white arrows for data_channel1 and data_channel2 indicate that the deadlock has been removed.

Referring again to Example 1, a selected FIFO channel depth of 14, which exceeds the minimum FIFO channel depth of 10, may be selected. In that case, EDA system 600 is capable of performing HDL simulation and provide a table via a GUI specifying the HDL simulation results. With the FIFO channel depth set to 14, the HDL simulation determines that the maximum depth occurring during the HDL simulation was indeed 10. Further, the write block time of both data_channel1 and data_channel2 is reduced to 0.0%. The process "proc_1" is able to write data to the FIFO channel data_channel1 smoothly with zero blocking time. This means that the FIFO channel depth of 10 is large enough to ensure both maximum performance and an absence of deadlocks.

Example 2 illustrates another version of proc_1 from the design of Example 1. In Example 2, proc_1 is modified to show an example of a data mismatch where proc_1 now produces 11 data items on data_channel1 and 10 values on data_channel2. This type of design error may not be cured by increasing the size or depth of the FIFO channel.

Example 2

```
void proc_1(hls::stream<int>& A, hls::stream<int>& data_channel1,
hls::stream<int>&
    data_channel2){
  int tmp;
  for(i = 0; i < 11; i++){
    tmp = A.read( );
    data_channel1.write(tmp);
  }
  for(int i = 0; i < 10; i++){
    data_channel2.write(tmp);
  }
}
```

In Example 2, the data rate mismatch may be observed given the small size of the example. In actual designs, however, there may be hundreds or thousands of FIFO channels making the identification of such data rate mismatches difficult.

The inventive arrangements described within this disclosure also facilitate performance optimization(s) of the design. That is, the same capabilities of EDA system 600, as provided through a GUI, may be used to guide a user to size FIFO channels to minimize stalling due to full FIFO channels to further improve performance. The discussion below is directed to write blocks (e.g., blocking of write operations of a circuit) since stalls of write blocks may be solved by FIFO channel sizing. Dealing with write blocks for optimization may be helpful since after all write blocks have been resolved, EDA system 600 may identify performance mismatches between processes. Examples of performance mismatches that may be detected by EDA system 600 may include processes that can be sped up to improve performance (the producers of the FIFO channels or ping-pong (PIPO) buffers that have frequent read blocks) and processes that may be slowed, thus saving resources, without affecting performance (e.g., the consumers of the FIFO channels or PIPO buffers).

Within an acyclic dataflow network, the bottleneck process (or sub-network), may be the process that limits the performance at the boundary between write blocking (i.e., after a chain of processes and channels that all block due to writes or due to lack of space in output FIFO channels and PIPO buffers), and read blocking (i.e., before a chain of processes and channels that all block due to reads or due to a lack of space in input FIFO channels and PIPO buffers).

In one or more example implementations, the boundary may be determined using EDA system 600 in performing HDL simulation with a "channel profiling" option enabled.

The boundary may be located in a GUI of EDA system by highlighting either the blocked write processes or FIFO channels or highlighting the blocked read processes or FIFO channels.

Once the boundary has been found, three main reasons for insufficient FIFO channel depths may be found considering that in dataflows, increasing FIFO channel depth can never reduce performance. The first reason is that one or more processes or sub-networks have an initiation interval larger (i.e., have a lower throughput) than their predecessor. EDA system 600 is capable of outputting the initiation interval as part of the data that is generated. Typically, input channels of these processes or regions are write blocked, while output channels are read blocked. In the case of processes, the initiation interval may be improved by introducing more pipelining, code restructuring, array reshaping, or the like. In the case of networks, the network may be analyzed to look for a boundary as previously described.

The second reason is that there may be a "bypass," i.e., a FIFO channel or a PIPO buffer that joins non-adjacent processes (or sub-networks) in the network. In that case, the bypassing FIFO channel must have enough depth to account for the full number of pipeline iterations from when the first process feeding the FIFO channel starts to when the last process consuming from the FIFO channel ends. In this calculation, the pipeline stage in which the FIFO channel is written and read must also be considered.

The third reason is a producer process (or sub-network) that demonstrates bursty write behavior or a consumer process that demonstrates bursty read behavior. Bursty write behavior for a producer refers to the producer process computing and performing many writes, then computing again.

In this case the FIFO channel between the producer and consumer must have enough depth to accommodate the full length of a burst to balance performance. For purposes of discussion, initiation interval and bypassing may be excluded leaving burstiness as the source of the problem.

In this example, EDA system 600 may provide an analysis function that is capable of displaying one or more timelines, e.g., graphs showing data transfers over time, with indicators such as color used to draw portions of the timeline indicating write blocks. Speeding up the reader process may be one way of addressing the blockage. In another aspect, the size of the FIFO channel may be increased.

For purposes of illustration, consider an example case scenario where increasing the size of the FIFO channel results in another set of FIFO channels starting to stall. If the now stalling FIFO channels are between the same set of processes in which stalls were previously observed, the size of these FIFO channels may also be increased. If after increasing the depth of these FIFO channels no process is stalling any more due to FIFO channels, e.g., the timelines all indicate no stalling, and the maximum depth recorded during HDL simulation shows what would be the "optimal" depth for this specific workload, the design may be optimized by increasing the FIFO channel depths. Otherwise, the size of the full FIFO channels should be increased again. Note that if the cause of the blocking is initiation interval mismatch, this procedure may never converge. In that case the only option to avoid blockages is to balance the performance of the processes.

Figure 11:
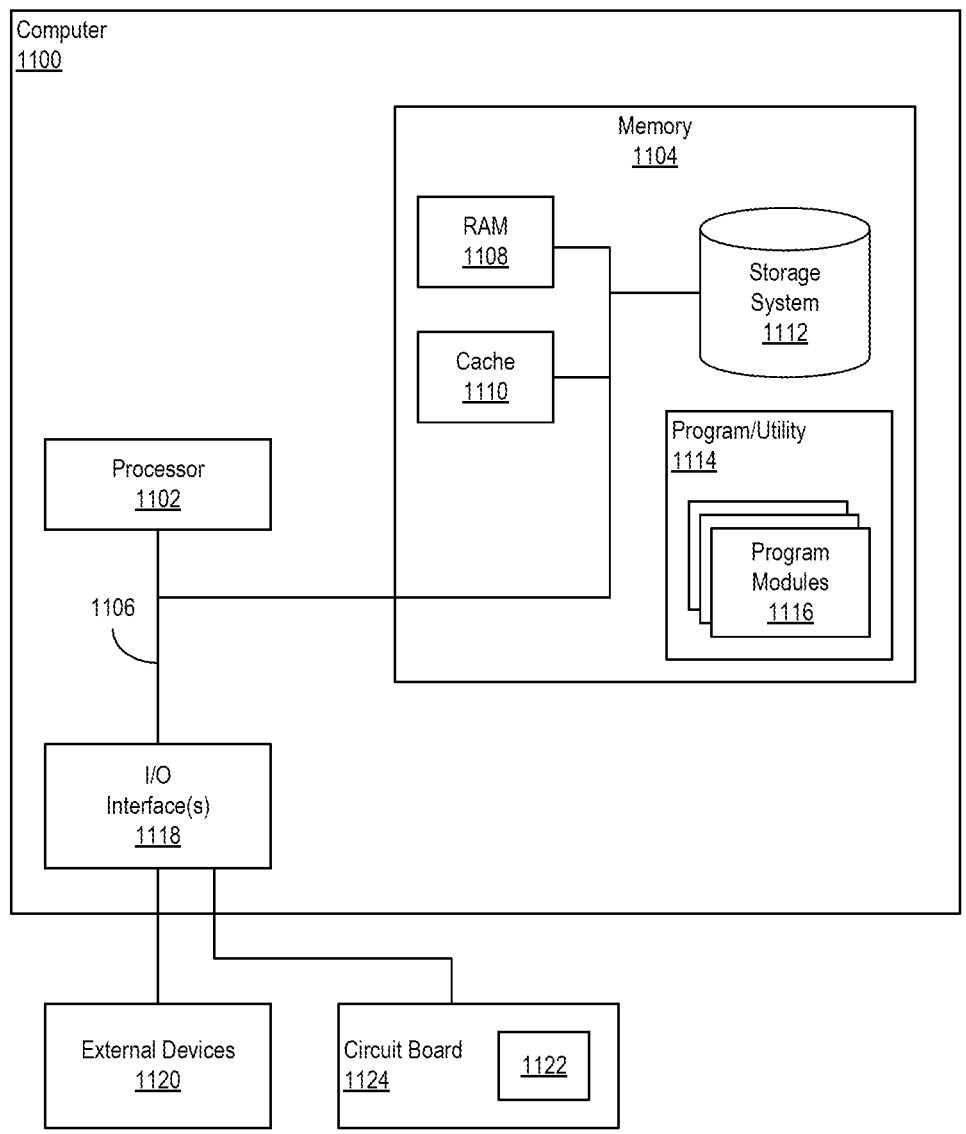
FIG. 11 illustrates an example implementation of a data processing system coupled to an IC.

FIG. 11 illustrates an example implementation of a data processing system, e.g., computer 1100, coupled to an IC 1122. Computer 1100 may be used to implement EDA system 600 as described herein. The arrangement illustrated in FIG. 11 may be used to perform hardware prototyping as described herein. It should be appreciated that EDA system 600, as embodied by computer 1100 in the example of FIG. 11, is capable of performing the operations described herein where hardware prototyping is not used. That is, computer 1100 may be used to implement any of the various data processing systems described herein such as an EDA system, an implementation and/or design tool, HLS application, design flow system, as described herein, other data processing system, and/or implementation tool executing suitable software to perform the various operations described herein.

The components of computer 1100 can include, but are not limited to, a processor 1102, a memory 1104, and a bus 1106 that couples various system components including memory 1104 to processor 1102. Processor 1102 may be implemented as one or more processors. In an example, processor 1102 is implemented as a central processing unit (CPU). Example processor types include, but are not limited to, processors having an x86 type of architecture (IA-32, IA-64, etc.), Power Architecture, ARM processors, and the like.

Bus 1106 represents one or more of any of a variety of communication bus structures. By way of example, and not limitation, bus 1106 may be implemented as a PCIe bus. Computer 1100 typically includes a variety of computer system readable media. Such media may include computer-readable volatile and non-volatile media and computer-readable removable and non-removable media.

In the example of FIG. 11, computer 1100 includes memory 1104. Memory 1104 can include computer-readable media in the form of volatile memory, such as random-access memory (RAM) 1108 and/or cache memory 1110. Computer 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Program/utility 1114, having a set (at least one) of program modules 1116, may be stored in memory 1104. By way of example, program modules 1116 may represent instructions that are executable by processor 1102 such as an operating system, one or more application programs, other program code, and program data. Program modules 1116 generally carry out the functions and/or methodologies of the example implementations described within this disclosure. For example, one or more of program modules 1116 can implement EDA, HLS, simulation, and/or analysis software capable of performing the various operations described within this disclosure upon execution by computer 1100. Program modules 1116 may also include program code that, when executed, allows computer 1100 to communicate with IC 1122.

Program/utility 1114 is executable by processor 1102. Program/utility 1114 and any data items used, generated, and/or operated upon by computer 1100 are functional data structures that impart functionality when employed by computer 1100.

Computer 1100 may include one or more Input/Output (I/O) interfaces 1118 communicatively linked to bus 1106. I/O interface(s) 1118 allow computer 1100 to communicate with one or more external devices 1120 and/or communicate over one or more networks such as a local area network (LAN), a wide area network (WAN), and/or a public network (e.g., the Internet). Examples of I/O interfaces 1118 may include, but are not limited to, network cards, modems, network adapters, hardware controllers, etc. Examples of external devices 1120 may include a display, a keyboard and/or a pointing device that enable a user to interact with computer 1100.

In an example implementation, I/O interfaces 1118 may include an adapter such as a PCIe adapter that facilitates communication between computer 1100 and IC 1122. IC 1122 may be disposed on a circuit board 1124. Circuit board 1124 may be implemented as a card that may be inserted into an available bus or PCIe slot of computer 1100 or is communicatively linked to computer 1100 in some other way. Circuit board 1124 may have one or more other components disposed thereon in communication with IC 1122. These components may include volatile memory such as RAM (not shown) and/or non-volatile memory such as flash memory (not shown).

Computer 1100 is only one example implementation of a computer. Computer 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 11 is not intended to suggest any limitation as to the scope of use or functionality of example implementations described herein. Computer 1100 is an example of a data processing system and/or computer hardware that is capable of performing the various operations described within this disclosure.

In this regard, computer 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computer 1100 may be operational with numerous other general-purpose or special-purpose computing system environments or configurations. Examples of computing systems, environments, and/or configurations that may be suitable for use with computer 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using computer 1100 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Program modules 1116 also may include software that is capable of performing an implementation flow on a circuit design or portion thereof. In this regard, computer 1100 serves as an example of one or more EDA tools or a system that is capable of processing circuit designs through a design flow (e.g., performing synthesis, placement, routing, and/or configuration bitstream generation).

Figure 12:
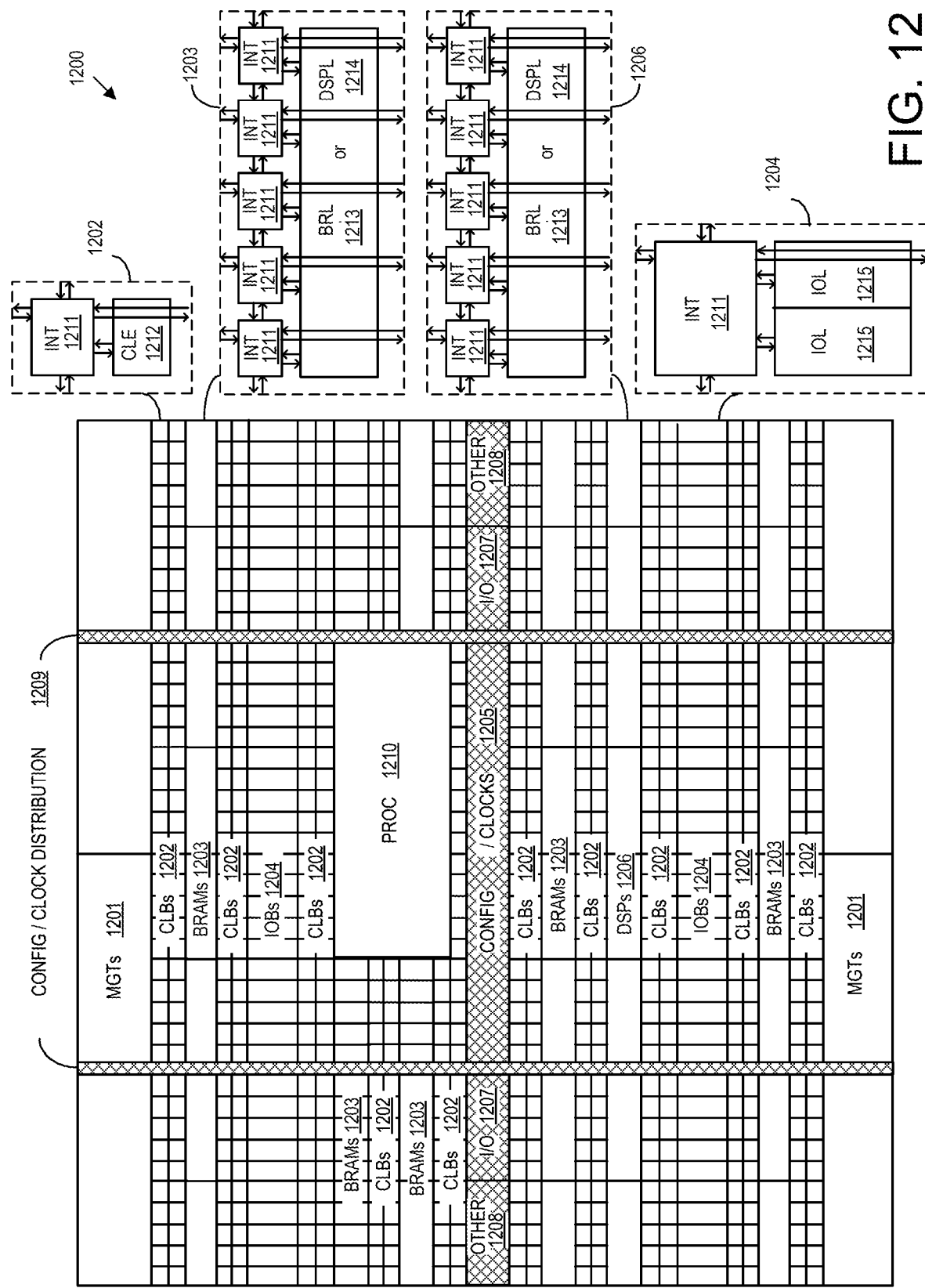
FIG. 12 illustrates an example architecture for an IC.

FIG. 12 illustrates an example architecture 1200 for an IC. In one aspect, architecture 1200 may be implemented within a programmable IC. A programmable IC is an IC with at least some programmable circuitry. Programmable circuitry may include programmable logic. For example, architecture 1200 may be used to implement a field programmable gate array (FPGA). Architecture 1200 may also be representative of an SoC type of IC. An example of an SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random-access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, the shaded area near the center of the die, e.g., formed of regions 1205, 1207, and 1208, may be used for configuration, clock, and other control logic. Shaded areas 1209 may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

A system as described herein in connection with FIG. 1, for example, is capable of further processing a circuit design having undergone the processing described herein for implementation within an IC having an architecture the same as or similar to that of FIG. 12. The system, for example, is capable of synthesizing, placing, and routing the circuit design. The system may also perform bitstream generation so that the bitstream may be loaded into the IC, thereby physically implementing the circuit design, or a portion thereof, within the IC.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory. A computer is an example of a data processing system.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   for each kernel of a plurality of kernels of a design, including, using computer hardware, a signal in the kernel that is asserted in response to all processes inside the kernel stalling;
   performing a first simulation of the design using an executable model of the design where a size of each of a plurality of First-In-First-Out (FIFO) channels of the design is permitted to grow according to data carried by each FIFO channel based on reads and writes to the FIFO channel;

for each kernel of the plurality of kernels, asserting the signal during the first simulation in response to each process in the kernel stalling;

detecting a data rate mismatch for a selected FIFO channel of the plurality of FIFO channels during the first simulation in response to detecting a rate of growth in size of the selected FIFO channel that exceeds a minimum predetermined rate; and generating a notification indicating the data rate mismatch based on the detecting.

2. The method of claim 1, further comprising:
determining a maximum depth for one or more other FIFO channels of the plurality of FIFO channels of the design during the first simulation.

3. The method of claim 2, further comprising:
generating a hardware description language (HDL) version of the design.

4. The method of claim 3, further comprising:
performing second simulation of the HDL version of the design and, during the second simulation, monitoring for a deadlock, wherein depths of the plurality of FIFO channels of the design are set to maximum depths determined during the first simulation; and outputting a further notification indicating whether a depth of the FIFO channels is adequate based on whether a deadlock is detected during the second simulation.

5. The method of claim 4, wherein, in response to detecting the deadlock during the second simulation, the notification indicates that a source of the deadlock is an error by a high-level synthesis tool in generating the HDL version of the design.

6. The method of claim 1, further comprising:
for each kernel of the plurality of kernels, generating blocking status data specifying which FIFO channels of an interface of the kernel are blocked during operation;

for a kernel stream graph specifying connections between the plurality of kernels, updating, using computer hardware, the kernel stream graph based on the blocking status data for the plurality of kernels; and in response to detecting a cycle in the kernel stream graph as updated, generating, using the computer hardware, a notification specifying which of the plurality of FIFO channels are involved in a deadlock.

7. The method of claim 6, wherein the updating includes the computer hardware adding edges to the kernel stream graph corresponding to blockages specified by the blocking status data.

8. The method of claim 6, wherein each kernel of the plurality of kernels includes a blocking matrix configured to store the blocking status data of the kernel, wherein each blocking matrix specifies a blocking status for each pair of FIFO channels of the kernel bidirectionally for each pair.

9. A system, comprising:
a processor configured to initiate operations including:
for each kernel of a plurality of kernels of a design, including a signal in the kernel that is asserted in response to all processes inside the kernel stalling;

performing a first simulation of the design using an executable model of the design where a size of each of a plurality of First-In-First-Out (FIFO) channels of the design is permitted to grow according to data carried by each FIFO channel based on reads and writes to the FIFO channel;

for each kernel of the plurality of kernels, asserting the signal during the first simulation in response to each process in the kernel stalling;

detecting a data rate mismatch of a selected FIFO channel of the plurality of FIFO channels during the first simulation in response to detecting a rate of growth in size of the selected FIFO channel that exceeds a minimum predetermined rate; and generating a notification indicating the data rate mismatch based on the detecting.

10. The system of claim 9, wherein the processor is configured to initiate executable operations including:
determining a maximum depth for each of the plurality of FIFO channels of the design during the first simulation;

generating a hardware description language (HDL) version of the design;

performing second simulation of the HDL version of the design and, during the second simulation, monitoring for a deadlock, wherein depths of the plurality of FIFO channels of the design set to the maximum depths determined during the first simulation; and outputting a further notification indicating whether a depth of the plurality of FIFO channels is adequate based on whether a deadlock is detected during the second simulation.

11. The system of claim 9, wherein the processor is configured to initiate executable operations including:
for each kernel of the plurality of kernels, generating blocking status data specifying which FIFO channels of an interface of the kernel are blocked during operation;

for a kernel stream graph specifying connections between the plurality of kernels, updating the kernel stream graph based on the blocking status data for the plurality of kernels; and in response to detecting a cycle in the kernel stream graph as updated, generating a notification specifying which FIFO channels of the plurality of kernels are involved in a deadlock.

12. A method, comprising:
for each kernel of a plurality of kernels of a design, including, using computer hardware, a signal in the kernel that is asserted in response to all processes inside the kernel stalling;

performing a first simulation of the design using an executable model of the design where a size of each of a plurality of First-In-First-Out (FIFO) channels of the design is permitted to grow according to data carried by each FIFO channel based on reads and writes to the FIFO channel;

for each kernel of the plurality of kernels, asserting the signal during the first simulation in response to each process in the kernel stalling;

detecting a data rate mismatch for a selected FIFO channel of the plurality of FIFO channels based, at least in part, on whether a size of the selected FIFO channel stabilizes during the first simulation to a particular maximum size;

for each kernel of the plurality of kernels, generating blocking status data specifying which FIFO channels of an interface of the kernel are blocked during operation;

for a kernel stream graph specifying connections between the plurality of kernels, updating, using computer hardware, the kernel stream graph based on the blocking status data for the plurality of kernels; and in response to detecting a cycle in the kernel stream graph as updated, generating, using the computer hardware, a notification specifying which of the plurality of FIFO channels are involved in a deadlock, wherein each kernel of the plurality of kernels includes a blocking matrix configured to store the blocking status data of the kernel, and wherein each blocking matrix specifies a blocking status for each pair of FIFO channels of the kernel bidirectionally for each pair.

13. The method of claim 12, further comprising:
determining a maximum depth for one or more other FIFO channels of the plurality of FIFO channels of the design during the first simulation.

14. The method of claim 13, further comprising:
generating a hardware description language (HDL) version of the design.

15. The method of claim 14, further comprising:
performing second simulation of the HDL version of the design and, during the second simulation, monitoring for a deadlock, wherein depths of the plurality of FIFO channels of the design are set to maximum depths determined during the first simulation; and
outputting a further notification indicating whether a depth of the FIFO channels is adequate based on whether a deadlock is detected during the second simulation.

16. The method of claim 15, wherein, in response to detecting the deadlock during the second simulation, the notification indicates that a source of the deadlock is an error by a high-level synthesis tool in generating the HDL version of the design.

* * * * *